(12) United States Patent
Blasco et al.

(10) Patent No.: US 10,452,434 B1
(45) Date of Patent: Oct. 22, 2019

(54) HIERARCHICAL RESERVATION STATION

(71) Applicant: Apple Inc., Cupertino, CA (US)

(72) Inventors: Conrado Blasco, Sunnyvale, CA (US); Sean M. Reynolds, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 76 days.

(21) Appl. No.: 15/701,139

(22) Filed: Sep. 11, 2017

(51) Int. Cl.
*G06F 9/48* (2006.01)
*G06F 9/50* (2006.01)

(52) U.S. Cl.
CPC .......... *G06F 9/4881* (2013.01); *G06F 9/5005* (2013.01); *G06F 9/5027* (2013.01)

(58) Field of Classification Search
CPC .................................................. G06F 9/4881
See application file for complete search history.

(56) References Cited

U.S. PATENT DOCUMENTS

| | | | |
|---|---|---|---|
| 5,519,864 A | 5/1996 | Martell et al. | |
| 5,809,323 A * | 9/1998 | Eisen .................... | G06F 9/3001 712/23 |
| 6,098,166 A | 8/2000 | Leibholz et al. | |
| 6,185,672 B1 | 2/2001 | Trull | |
| 6,205,542 B1 | 3/2001 | Grochowski et al. | |
| 6,237,081 B1 | 5/2001 | Le et al. | |
| 6,378,062 B1 | 4/2002 | Abramson et al. | |
| 6,385,715 B1 | 5/2002 | Merchant et al. | |
| 6,785,802 B1 | 8/2004 | Roy | |
| 6,981,129 B1 | 12/2005 | Boggs et al. | |
| 9,336,003 B2 | 5/2016 | Mylius et al. | |
| 9,367,322 B1 | 6/2016 | Brownscheidle et al. | |
| 9,740,495 B2 | 8/2017 | Guo et al. | |
| 10,120,690 B1 | 11/2018 | Srinivasa et al. | |
| 2004/0168078 A1 * | 8/2004 | Brodley ................. | G06F 21/52 713/190 |
| 2006/0179274 A1 | 8/2006 | Jones et al. | |
| 2006/0179346 A1 | 8/2006 | Bishop et al. | |
| 2007/0028078 A1 | 2/2007 | Harris et al. | |
| 2007/0198812 A1 | 8/2007 | Abernathy et al. | |
| 2009/0063735 A1 | 3/2009 | Ng et al. | |
| 2010/0205406 A1 | 8/2010 | Hooker et al. | |
| 2010/0332806 A1 | 12/2010 | Golla et al. | |
| 2011/0185159 A1 | 7/2011 | Bishop et al. | |

(Continued)

*Primary Examiner* — Farley Abad
(74) *Attorney, Agent, or Firm* — Meyertons Hood Kivlin Kowert and Goetzel PC; Rory D. Rankin

(57) ABSTRACT

Systems, apparatuses, and methods for efficiently scheduling processor instructions for execution. The reservation station in a processor stores instructions in each of a primary buffer and a secondary buffer. Control logic selects a first number of instructions with ready source operands in the primary buffer and a second number of instructions with ready source operands in the secondary buffer. If a third number of instructions to issue from the reservation station is greater than the first number of instructions, then the reservation station issues one or more instructions of the second number of instructions from the secondary buffer to the one or more execution units. Control logic selects a fourth number of instructions in the secondary buffer to transfer to the primary buffer, and cancels the transfer of a given instruction in response to determining the given instruction has issued to the one or more execution units.

20 Claims, 8 Drawing Sheets

(56) References Cited

U.S. PATENT DOCUMENTS

| | | |
|---|---|---|
| 2013/0046956 A1 | 2/2013 | Tran |
| 2013/0339679 A1* | 12/2013 | Iyer ..................... G06F 9/3851 |
| | | 712/225 |
| 2014/0380024 A1 | 12/2014 | Spadini et al. |
| 2015/0007188 A1 | 1/2015 | Sutanto et al. |
| 2015/0277925 A1 | 10/2015 | Sleiman et al. |
| 2015/0363205 A1 | 12/2015 | Guo et al. |
| 2016/0011876 A1* | 1/2016 | Mukherjee ............ G06F 9/3855 |
| | | 712/225 |
| 2016/0110200 A1* | 4/2016 | Carlson ................ G06F 9/3855 |
| | | 712/215 |
| 2016/0350120 A1 | 12/2016 | Col et al. |
| 2016/0350123 A1 | 12/2016 | Col et al. |
| 2017/0024205 A1 | 1/2017 | Kountanis et al. |
| 2017/0091097 A1* | 3/2017 | Waugh ................ G06F 12/0815 |

* cited by examiner

HIERARCHICAL RESERVATION STATION

BACKGROUND

Technical Field

Embodiments described herein relate to the field of processors and, more particularly, to efficiently scheduling processor instructions for execution.

Description of the Related Art

A processor is hardware circuitry combined with software, firmware and an operating system to execute instructions defined by a particular instruction set architecture. Improvements in semiconductor fabrication provide faster and smaller devices used in the hardware circuitry. These improvements support higher operating clock frequencies shorter clock cycles. To further increase throughput of instruction processing, modern processors use microarchitecture techniques such as multiple pipeline stages, out-of-order execution, register renaming and speculative execution.

Although higher throughput can be achieved with the microarchitecture techniques, particular paths still exist in the processor that cannot fit within a single clock cycle if these paths are expanded to include a greater number of instructions. One such path is the selection of instructions to issue from a reservation station to available execution units. Data dependencies, instruction latencies, inter-stage communication, such as any broadcast bus(es), the size of one or more queues used for storing candidate instructions for selection, and other factors affect the number of levels of logic used to schedule instructions for issue. For example, increasing the size of queues in order to consider a larger number of candidate instructions for selection also increases the number of levels of logic used to schedule instructions for issue. Consequently, the execution time of the circuit also increases and the selection of instructions to issue cannot continue to be performed with a single clock cycle without reducing the operating clock frequency.

In view of the above, methods and mechanisms for efficiently scheduling processor instructions for execution are desired.

SUMMARY

Systems, apparatuses, and methods for efficiently scheduling processor instructions for execution are contemplated. In various embodiments, a processor includes one or more execution units for executing instructions of a computer program and a dispatch unit for dispatching decoded instructions to a reservation station. The reservation station may include at least a primary buffer and a secondary buffer, each for storing instructions. In various embodiments, each instruction stored in the primary buffer has a higher priority than any instruction stored in the secondary buffer. In some embodiments, determining the priority for an instruction is based on one or more of program order, an assigned priority level for the instruction, a thread identifier and/or a process identifier for the instruction and so forth.

The control logic determines which entries in each of the primary buffer and the secondary buffer store instructions with ready source operands and available execution units for executing the stored instructions with ready source operands. For example, the control logic includes first selection logic for determining a first number of instructions stored in the primary buffer that have both ready source operands and available execution units for executing the instructions. Additionally, the control logic includes second selection logic for determining a second number of instructions stored in the secondary buffer that have both ready source operands and available execution units for executing the instructions. The issue width is the maximum number of instructions the reservation station is able to issue to one or more execution units in a clock cycle. The control logic determines whether the issue width of the reservation station is greater than the first number of instructions. If so, the control logic issues the first number of instructions from the primary buffer. Additionally, when the second number is non-zero, the control logic issues one or more instructions of the second number of instructions from the secondary buffer to the one or more execution units. The sum of the first number of instructions from the primary buffer and the one or more instructions of the second number of instructions from the secondary buffer does not exceed and may equal the issue width of the reservation station.

As seen from above, although instructions have lower priority in the secondary buffer, one or more of the instructions in the secondary buffer may issue prior to unselected instructions stored in the primary buffer. The control logic also selects a number of instructions in the secondary buffer to transfer to the primary buffer. In some embodiments, the number of instructions to transfer includes instructions with a highest priority among the instructions stored in the secondary buffer, although the source operands may not yet be ready or the execution units for executing the instructions may not be available.

In some embodiments, the control logic cancels, or invalidates, the transfer of a given instruction from the secondary buffer to the primary buffer in response to determining that the given instruction has issued to the one or more execution units. Therefore, the given instruction is not issued twice, and it no longer consumes resources that can be used by other instructions. In various embodiments, the control logic sends an indication to the dispatch unit, which includes a value suggesting a number of instructions to dispatch from the dispatch unit to the reservation station. In some embodiments, the value is a number of available entries within the reservation station. In other embodiments, the value is a number of credits, or other value corresponding to the number of available entries within the reservation station. In some embodiments, the value is based on only newly deallocated entries such as entries deallocated within a past clock cycle. The value may be based on at least one or more of the instructions in the second number of instructions selected for issue from the secondary buffer. The value may also be based on one or more of the instructions selected for transfer from the secondary buffer to the primary buffer. The dispatch unit receives the indication with the value, but the dispatch unit may not be aware of separate buffers, such as each of the primary buffer and the secondary buffer, within the reservation station. It is noted that the control logic within the dispatch unit may or may not dispatch the suggested number of instructions all at one time since the dispatch unit uses other criteria to determine both how many instructions to dispatch and when to dispatch instructions.

These and other embodiments will be further appreciated upon reference to the following description and drawings.

BRIEF DESCRIPTION OF THE DRAWINGS

The above and further advantages of the methods and mechanisms may be better understood by referring to the following description in conjunction with the accompanying drawings, in which.

Figure 1:
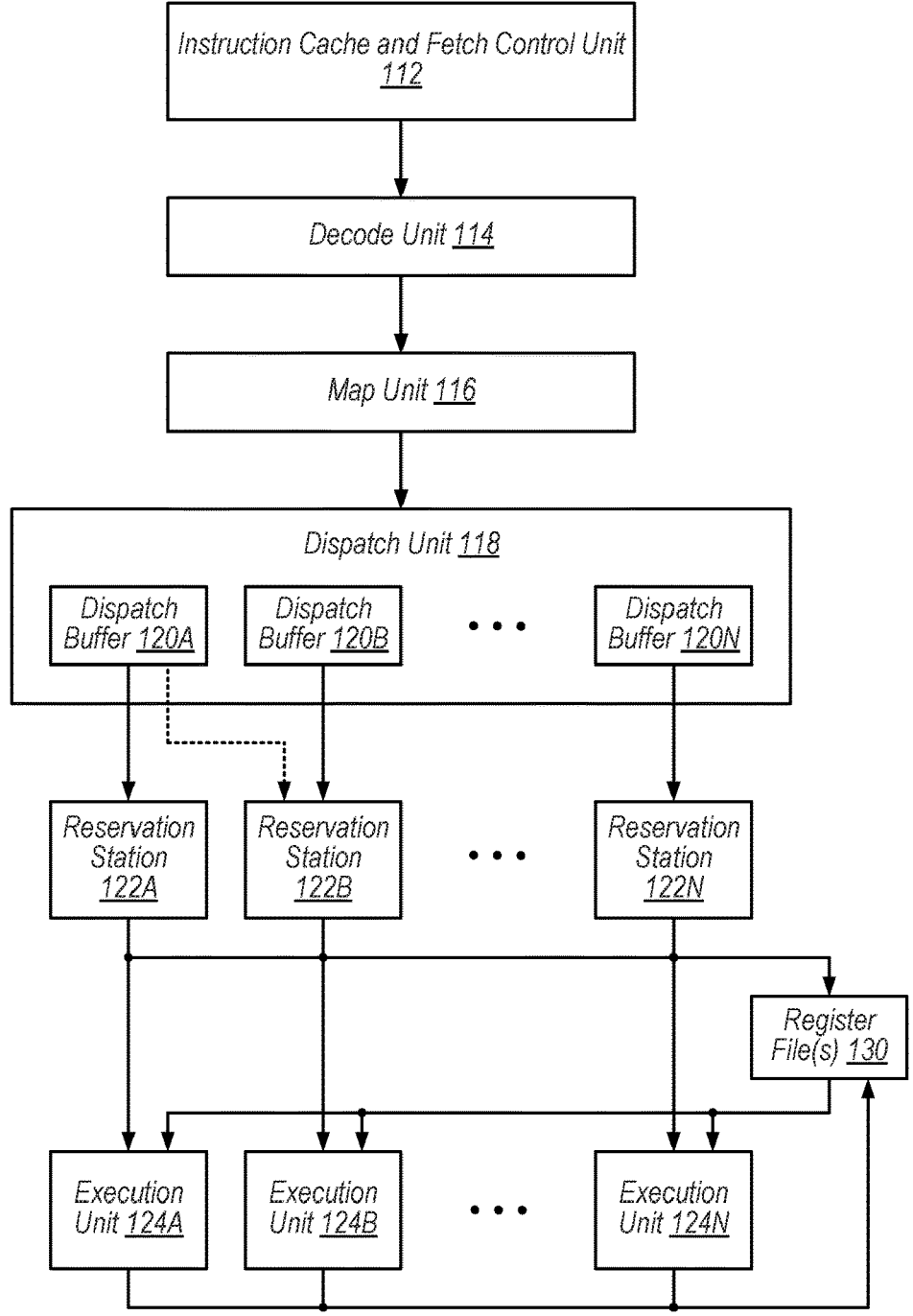
FIG. 1 is a block diagram illustrating one embodiment of a portion of a processor.

While the embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) for that unit/circuit/component.

DETAILED DESCRIPTION OF EMBODIMENTS

In the following description, numerous specific details are set forth to provide a thorough understanding of the embodiments described in this disclosure. However, one having ordinary skill in the art should recognize that the embodiments might be practiced without these specific details. In some instances, well-known circuits, structures, and techniques have not been shown in detail for ease of illustration and to avoid obscuring the description of the embodiments.

Turning now to FIG. 1, a block diagram of one embodiment of a portion of a processor 100 is shown. In the illustrated embodiment, the processor 100 includes an instruction cache and fetch control unit 112, a decode unit 114, a map unit 116, a dispatch unit 118, a set of reservation stations 122A-122N, a set of execution units 124A-124N, and one or more register files 130. The instruction cache and fetch control unit 112 is coupled to the decode unit 114, which is coupled to the map unit 116. The map unit 116 is coupled to the dispatch unit 118, which is further coupled to the reservation stations 122A-122N. The reservation stations 122A-122N are coupled to respective execution units 124A-124N and the register file(s) 130. The register file(s) 130 are further coupled to the execution units 124A-124N. It is noted that processor 100 may include other components and interfaces not shown in FIG. 1.

In one embodiment, the dispatch unit 118 may include a set of dispatch buffers 120A-120N, which are representative of any number of dispatch buffers. Each of the dispatch buffers 120A-120N is coupled to a corresponding reservation station 122A-122N. For example, dispatch buffer 120A is coupled to reservation station 122A. Additionally, in some embodiments, dispatch buffer 120A may also be coupled to reservation station 122B and/or one or more other reservation stations. Similarly, dispatch buffer 120B is coupled to reservation station 122B and may also be coupled to one or more other reservation stations. It should be understood that any configuration of dispatch buffers and reservation stations may be utilized depending on the embodiment. For example, in another embodiment, each dispatch buffer 120 may be coupled to two separate reservation stations 122. Other embodiments may implement more than two reservation stations per dispatch buffer 120, if desired.

In various embodiments, instruction operations may be captured by the dispatch buffers 120A-120N based on the type of instruction operation (e.g. integer, load/store, or floating point). It is noted that the term "instruction operation" may be more briefly referred to herein as an "op". In one embodiment, load/store ops may be captured by dispatch buffer 120A, which may be coupled to a load/store reservation station 122A, which may be further coupled to a load/store execution unit 124A. In this embodiment, integer ops may be captured by the dispatch buffer 120B and floating point ops may be captured by dispatch buffer 120N. Alternatively, in another embodiment, dispatch buffer 120A may be coupled to two load/store reservation stations 122A-B, which may each be coupled to a corresponding load/store execution unit 124A-B. More than one integer reservation station and/or more than one floating point reservation station may also be utilized, depending on the embodiment.

Among ops of a given type, more than one of the dispatch buffers 120A-120N may be eligible to receive the ops. For example, integer ops may be received by multiple of dispatch buffers 120A-120N. Some ops may be restricted to a particular dispatch buffer, dependent on the hardware implemented in the corresponding execution units. For example, the execution unit 124A may be the only integer execution unit with a multiplier in one embodiment. Similarly, the execution unit 124B may be the only integer execution unit with a divider in one embodiment. Still further, the execution unit 124N may be the only unit having branch processing circuitry. Other integer ops (e.g. add/subtract ops, logical ops, shift/rotate ops, etc.) may be executed by any integer execution unit of execution units 124A-N. Other embodiments may include different hardware definitions and different numbers of execution units having specific execution hardware, as desired.

The instruction cache and fetch control unit 112 may be configured to cache instructions previously fetched from memory, and may be configured to speculatively fetch a stream of instructions for the processor 100. The instruction cache and fetch control unit 112 may implement various prediction structures to predict the fetch stream. For example, a next fetch predictor may be used to predict fetch addresses based on previously executed instruction streams. Branch predictors of various types may be used to verify the next fetch prediction, or may be used to predict next fetch addresses if the next fetch predictor is not used.

The decode unit 114 may be configured to decode the instructions into instruction operations that are executable by the execution units 124A-124N. In some embodiments, a given instruction may be decoded into one or more instruction operations, depending on the complexity of the instruction. Particularly complex instructions may be microcoded, in some embodiments. In such embodiments, the microcode routine for the instruction may be coded in micro-ops (or µops). For the purposes of simplicity, the terms "instruction operation", "op", and "µop" may be used interchangeably herein. In other embodiments, each instruction in the instruction set architecture implemented by the processor 100 may be decoded into a single instruction operation, and thus the instruction operation may be essentially synonymous with the instruction (although it may be modified in form by the decoder). The map unit 116 may be configured to perform register renaming on the ops, assigning physical registers in the register files 130 for each source and destination register in the ops. In one embodiment, map unit 116 may be configured to generate dependency vectors for the ops, wherein the dependency vectors identify the ops on which a given op is dependent. The map unit 116 may provide the dependency vectors for each op to dispatch unit 118 and/or reservation stations 122A-N.

In one embodiment, the reservation stations 122A-122N may each store ops to be executed by a corresponding execution unit 124A-124N. That is, in this embodiment, there is a one-to-one correspondence between reservation stations 122A-122N and execution units 124A-124N. The reservation stations 122A-122N may be configured to track dependencies of the ops stored therein, and may be configured to schedule ops for which the dependencies have been satisfied (or are currently being satisfied by an executing op which will forward the result data to the op). In this embodiment, the reservation stations 122A-122N may track dependencies but may not actually capture operand data. Instead, register files 130 may be used to read the operand data (and there may be forwarding paths for results generated by the execution units 124A-124N). Thus, the reservation stations 122A-122N may include storage implementing a number of entries for ops (e.g., random access memory arrays, flops, registers) as well as control circuitry configured to track/resolve dependencies and to schedule ops. Other embodiments may be configured to capture the operand data in the reservation stations as well. In such embodiments, the register files 130 may be read as each op enters the reservation stations 122A-122N. Forwarding results may be captured by both the reservation stations 122A-122N and the register files 130, in order to update their respective contents based on the forwarded results.

In various embodiments, one or more of the reservation stations 122A-122N include at least a primary buffer and a secondary buffer, each for storing ops. In various embodiments, each op stored in the primary buffer has a higher priority than any op stored in the secondary buffer. In some embodiments, determining the priority for an op is based on one or more of an age of the op in program order, an assigned priority level for the op, a thread identifier and/or a process identifier for the op, and so forth.

Control logic within the reservation stations 122A-122N selects a first number of ops in the primary buffer with ready source operands and available execution units and a second number of ops in the secondary buffer with ready source operands and available execution units for issue. Each of the first number and the second number is a positive integer including zero. In an embodiment, the first number is zero and the second number is a non-zero value. The control logic determines whether a number of ops to issue from a given one of the reservation stations 122A-122N is greater than the first number of ops with ready source operands in the primary buffer for issue. For example, the issue width may support a greater number of ops than the current first number of ops. If so, the control logic in the given one of the reservation stations 122A-122N issues one or more ops of the second number of ops from the secondary buffer to the one or more execution units 124A-124N when the second number is non-zero. The control logic in the given one of the reservation stations 122A-122N also issues the first number of ops selected in the primary buffer. Although ops have lower priority in the secondary buffer, in this case, one or more of the ops in the secondary buffer issue prior to unselected ops stored in the primary buffer.

The control logic in the reservation stations 122A-122N also selects a number of ops in the secondary buffer to transfer to the primary buffer. In some embodiments, the number of ops to transfer includes ops with a highest priority among the ops stored in the secondary buffer, although the source operands may not yet be ready or the execution units for executing the instructions may not yet be available. In some embodiments, the control logic cancels, or invalidates, the transfer of a given op from the secondary buffer to the primary buffer in response to determining that the given op has issued to the one or more execution units 124A-124N. Therefore, the given op is not issued twice, and it no longer consumes resources that can be used by other ops. In various embodiments, the control logic in a given one of the reservation stations 122A-122N sends an indication to the dispatch unit 118, which includes a value suggesting a number of ops to dispatch from the dispatch unit 118. In some embodiments, the value is a number of available entries within the given reservation station. In other embodiments, the value is a number of credits, or other value corresponding to the number of available entries within the given reservation station. In some embodiments, the value is based on only newly deallocated entries such as entries deallocated within a past clock cycle. The value may be based on at least one or more of the ops in the second number of ops selected for issue from the secondary buffer. The value may also be based on one or more of the ops selected for transfer from the secondary buffer to the primary buffer. The dispatch unit receives the indication with the value, but the dispatch unit may not be aware of separate buffers, such as each of the primary buffer and the secondary buffer, within the reservation station. It is noted that the control logic within the dispatch unit may or may not dispatch the suggested number of ops all at one time since the dispatch unit uses other criteria to determine both how many ops to dispatch and when to dispatch ops.

The register files 130 may be one or more sets of physical registers, which may be mapped to the architected registers coded into the instructions stored in the instruction cache and fetch control unit 112. There may be separate physical registers for different operand types (e.g., integer, media, floating point) in an embodiment. In other embodiments, the physical registers may be shared over operand types. The register files 130 may be configured to output operands read in response to ops issued for execution by the reservation stations 122A-122N to the respective execution units 124A-124N. The register files 130 may also be configured to capture results generated by the execution units 124A-124N and written to the destination registers of the ops.

One or more of execution units 124A-124N may be an integer execution unit that is configured to execute integer ops. Generally, an integer op is an op that performs a defined operation on integer operands. Integers may be numeric values in which each value corresponds to a mathematical integer. Different circuitry may be allocated to different ones of execution units 124A-124N for performing different types of operations on integer operands. For example, a first execution unit 124 may include a multiplier, a second execution unit 124 may include a divider, a third execution unit 124 may include branch processing hardware to process branch ops, and so on. In one embodiment, each of the integer execution units may include adder hardware, shift/rotate hardware, logical operation hardware, etc. to perform dynamically-assigned integer operations.

One or more of execution units 124A-124N may be a load/store execution unit that is configured to execute load/store ops. Generally, a load op may specify a transfer of data from a memory location to a register, while a store op may specify a transfer of data from a register to a memory location. The load/store execution unit(s) may include load queues, store queues, and/or load/store queues to handle load/store ops that have generated memory addresses but are awaiting cache fills or to commit data to the cache or memory. A data cache, not shown, may be coupled to the load/store execution units and may be accessed to complete load/store ops without transmission to the memory subsystem in the case of a cache hit.

One or more of execution units 124A-124N may be a floating point execution unit that is configured to execute floating point ops. Generally, floating point ops may be ops that have been defined to operate on floating point operands. A floating point operand is an operand that is represented as a base raised to an exponent power and multiplied by a mantissa (or significand). The exponent, the sign of the operand, and the mantissa/significand may be represented explicitly in the operand, and the base may be implicit (e.g. base 2, in an embodiment). In various embodiments, additional execution units of other types may also be included (e.g., media units).

Each execution unit may comprise hardware configured to perform the operations defined for the ops that the particular execution unit is defined to handle. The execution units may generally be independent of each other, in the sense that each execution unit may be configured to operate on an op that was issued to that execution unit without dependence on other execution units. Viewed in another way, each execution unit 124A-124N may be an independent pipe for executing ops. The reservation stations 122A-122N may be part of the independent pipe with the corresponding execution unit 124A-124N.

Figure 2:
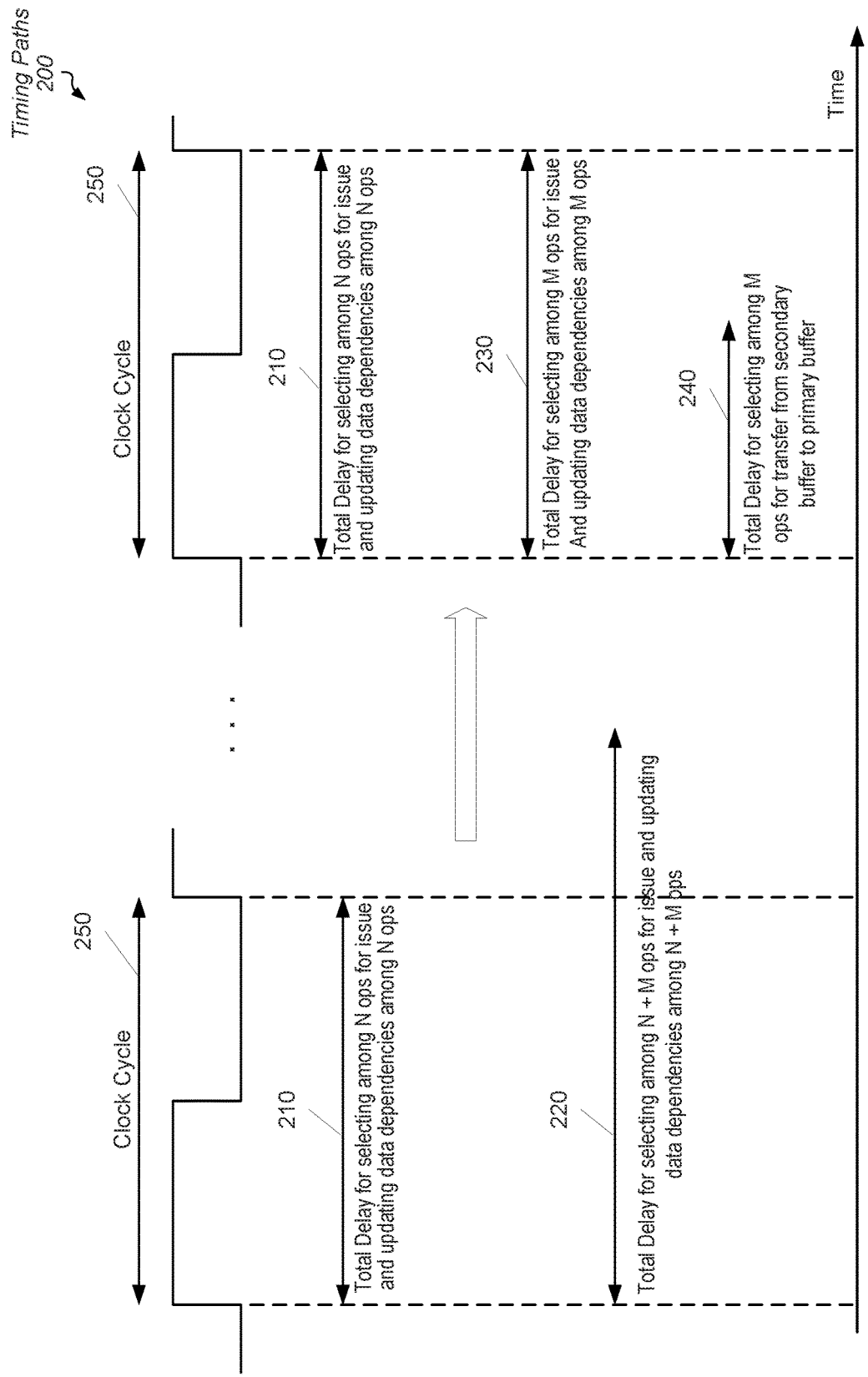
FIG. 2 is a block diagram of one embodiment of timing paths for a reservation station.

Turning now to FIG. 2, a block diagram of one embodiment of timing paths 200 for a reservation station is shown. In the illustrated embodiment, a critical path within a reservation station is shown as delay 210. The delay 210 is an amount of time for selection logic to select ops for issue among N ops, where N is a non-zero positive integer. The selection is a based on a priority. In some embodiments, determining the priority for an op is based on one or more of an age of the op in program order, an assigned priority level for the op, a thread identifier and/or a process identifier for the op, and so forth. The delay 210 additionally includes an amount of time for control logic to use data dependence information and identification of which ops issued to determine which ops have every source operand ready among N ops (or will have source operands forwarded for just-in-time execution by forwarding logic after an executing op completes). The delay 210 fits within the clock cycle 250 with relatively little extra time.

A larger reservation station storing greater than N ops to choose from for issue allows more ops to proceed in the processor pipeline despite data dependencies and control dependencies. Storing more than N ops also allows more dispatches to occur to another reservation station if another one exists. However, the latencies also increase. As shown, the delay 220 is an amount of time for selection logic to select ops for issue among the sum of N and M ops, where M is a non-zero positive integer. The delay 220 additionally includes an amount of time for control logic to use data dependence information and identification of issued ops to determine which ops have every source operand ready among the sum of N and M ops (or will have source operands forwarded for just-in-time execution by forwarding logic after an executing op completes). The delay 220 exceeds the clock cycle 250. Therefore, the operational frequency needs to decrease to expand reservation stations to store the sum of N and M ops.

In contrast to the above, a hierarchical structure within a reservation station allows two separate buffers to store ops and separate control logic to select ops for a given buffer for issue. For example, a primary buffer has entries for storing N ops. A secondary buffer different from the primary buffer has entries for storing M ops. Separate control logic selects ops for issue among N ops stored in the primary buffer based on priority. This control logic performs this selection independent of the data stored in the secondary buffer. The delay for this determination is shown again as delay 210. Similarly, separate control logic selects ops for issue among M ops stored in the secondary buffer based on priority. This control logic performs this selection independent of the data stored in the primary buffer. The delay for this determination is shown as delay 230. In some embodiments, delay 230 overlaps with delay 210 rather than adding to the delay 210.

Separate control logic determines which ops have every source operand ready among the N ops stored in the primary buffer (or will have source operands forwarded for just-in-time execution by forwarding logic after an executing op completes). This control logic performs this determination independent of the data stored in the secondary buffer. Again, the delay for this determination is within delay 210. Similarly, separate control logic determines which ops have every source operand ready among the M ops stored in the secondary buffer (or will have source operands forwarded for just-in-time execution by forwarding logic after an executing op completes). This control logic performs this determination independent of the data stored in the primary buffer. The delay for this determination is within delay 230.

In various embodiments, control logic selects a number of ops in the secondary buffer to transfer to the primary buffer. In some embodiments, the number of ops includes ops with a highest priority among the ops stored in the secondary buffer although the source operands may not yet be ready. The amount of time to perform this determination is shown as delay 240. Delay 240 occurs in parallel with delay 210 and delay 230. Therefore, the reservation station is able to expand without increasing the clock cycle 250.

Figure 3:
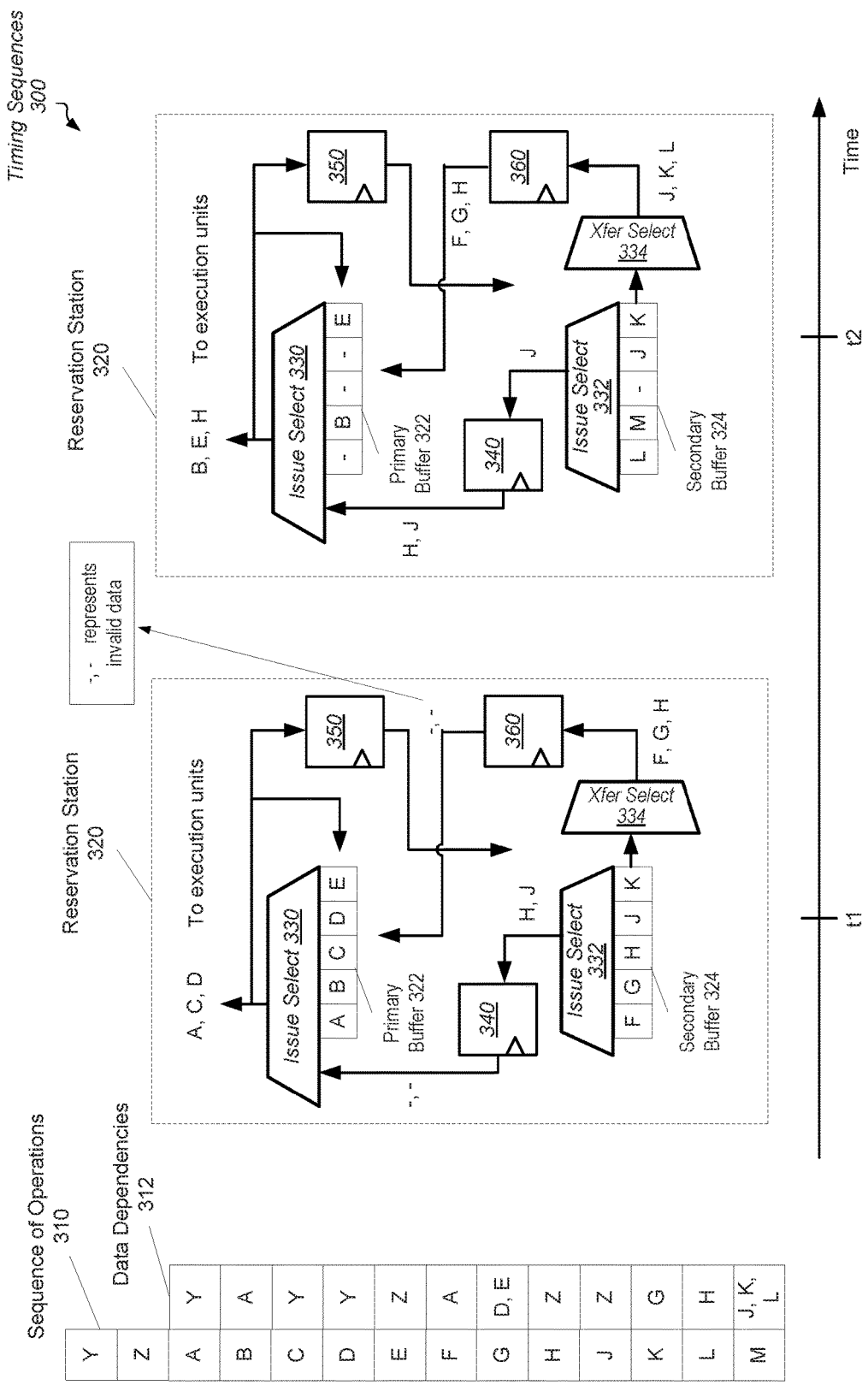
FIG. 3 is a block diagram of one embodiment of a timing sequence of a reservation station processing operations.

Referring to FIG. 3, a block diagram of one embodiment of timing sequences 300 of a reservation station processing operations is shown. In the illustrated embodiment, the sequence of operations 310 include ops Y, Z and A-M in program order. Data dependencies 312 are also indicated. For example, op A has a data dependency with op Y, op B has a data dependency with op A, and so forth. The data dependencies for ops Y and Z are not shown since at this point for the illustrated example, these ops are already issued and executed. Reservation station 320 stores ops in a primary buffer 322 and a secondary buffer 324. In various embodiments, each instruction stored in primary buffer 322 has a higher priority than any instruction stored in the secondary buffer 324. In some embodiments, determining the priority for an op is based on one or more of an age of the instruction in program order, an assigned priority level for the instruction, a thread identifier and/or a process identifier for the instruction and so forth.

Selection logic for selecting ops for issue for the primary buffer 322 is shown as issue select 330, which, in some embodiments, includes many multiplexors arranged in a particular order. Similarly, selection logic selecting ops for issue for the secondary buffer 324 is shown as issue select 332, which, in some embodiments, includes many multiplexors arranged in a particular order. Selection logic for selecting ops for transfer from the secondary buffer 324 to the primary buffer 322 is shown as transfer (xfer) select 334.

As shown, at least one set of staging sequential elements 340 is used to add a single stage boundary between the output of issue select 332 and the input of issue select 330. One or more staging clock cycles may be used as stage boundaries based on the duration of the clock cycle, the latencies for issue select 330 and issue select 332, the propagation delay to route the output of issue select 332 to the input of issue select 330, and the added latency for issue select 330 by connecting the output of issue select 332 and the input of issue select 330. A single stage boundary delays by one clock cycle selection for issue from issue select 330 of selected operations from the secondary buffer 324 with respect to selection for issue of instruction operations from the primary buffer 322. In some embodiments, there are no stage boundaries if the primary buffer 322 and the secondary buffer 324 are located relatively close to one another and there is time left in the clock cycle for the added delay from the propagation delay and the added latency to issue select 330. In other embodiments, the staging sequential elements 340 provide multiple stage boundaries.

The output of issue select 330 returns to control logic (not shown for ease of illustration) for the primary buffer 322 to determine whether source operands for outstanding ops are ready based on the recently issued ops. As shown, a single stage boundary is used between the output of issue select 330 and the input of control logic (not shown) for the secondary buffer 324. The staging sequential elements 350 provide the stage boundary. As described above, the number of stage boundaries ranges from zero to many stage boundaries.

The logic for xfer select 334 selects ops to transfer from the secondary buffer 324 to the primary buffer 322. In some embodiments, the selected ops include ops with a highest priority among the ops stored in the secondary buffer 324, although the source operands may not yet be ready or the execution units for executing the ops are not yet available. As described earlier, in some embodiments, determining the priority for an op is based on one or more of an age of the op in program order, an assigned priority level for the op, a thread identifier and/or a process identifier for the op, and so forth. In some embodiments, no staging is used for transferring the selected ops from the secondary buffer 324 to the primary buffer 322. In other embodiments, the transfer of ops is staged by one or more clock cycles. For example, staging elements 360 receives the selected information. In the illustrated embodiment, the transfer width is three ops, although in other embodiments, any number of ops is supported for the transfer width.

Returning to the ops of the program code 310, each of the primary buffer 322 and the secondary buffer 324 stores ops based on priority. In the illustrated embodiment, priority is based on program order. Primary buffer 322 stores the five oldest ops A-E in program order and secondary buffer 324 stores the next five oldest ops F-K. Although each of primary buffer 322 and secondary buffer 324 is shown to include a same number of entries for storing ops, which is five entries, it is possible and contemplated that buffer 322 includes a number of entries different from a number of entries included in buffer 324. Additionally, each of buffer 322 and 324 may include any number of entries.

In the illustrated embodiment, at time t1, issue select 330 selects the ops A, C and D from primary buffer 322 as the highest priority ops with ready source operands to issue to one or more available execution units. The issue width is the maximum number of instructions the reservation station is able to issue to one or more execution units in a clock cycle. In the illustrated embodiment, the issue width is three ops, although in other embodiments, any number of ops is supported for the issue width. Indications of the destination operands for ops A, C and D, in addition to any further latency information for these ops, are returned to the control logic for the primary buffer 322. Additionally, this information is sent to the staging elements 350.

Issue select 332 selects ops H and J from secondary buffer 324 as the highest priority ops with ready source operands to issue to one or more available execution units. Staging elements 340 receives the selected information. In addition, xfer select 334 selects ops F, G and H from the secondary buffer 324 to send to the primary buffer 322. One or more of ops F, G and H may not have all source operands ready. Staging elements 360 receives the selected information. In the illustrated embodiment, the transfer width is three ops, although in other embodiments, any number of ops is supported for the transfer width.

At time t2, issue select 330 selects the ops B and E from primary buffer 322 as the highest priority ops with ready source operands to issue to one or more available execution units. Additionally, issue select 330 selects op H, which was sent to issue select 330 from the staging elements 340. Indications of the destination operands for ops B, E and H, in addition to any further latency information for these ops, is returned to the control logic for the primary buffer 322. Additionally, this information is sent to the staging elements 350. Primary buffer 322 receives the transferred ops F, G and H from the staging elements 360.

Secondary buffer 324 receives the ops L and M from the dispatch unit (not shown). In some embodiments, the ops L and M are not yet received by secondary buffer 324, due to additional stage boundaries between the dispatch unit and secondary buffer 324. Issue select 332 selects the op J from secondary buffer 324 as the highest priority op with ready source operands to issue to one or more available execution units. Staging elements 340 receives the selected information. In addition, xfer select 334 selects ops J, K and L from secondary buffer 324 to send to primary buffer 322. One or more of ops J, K and L may not have all source operands ready. Staging elements 360 receives the selected information. In some embodiments, op J is not selected by issue select 332, since it may not yet be known whether op J was selected for issue by issue select 330. The steps for further processing are described in the following description.

Figure 4:
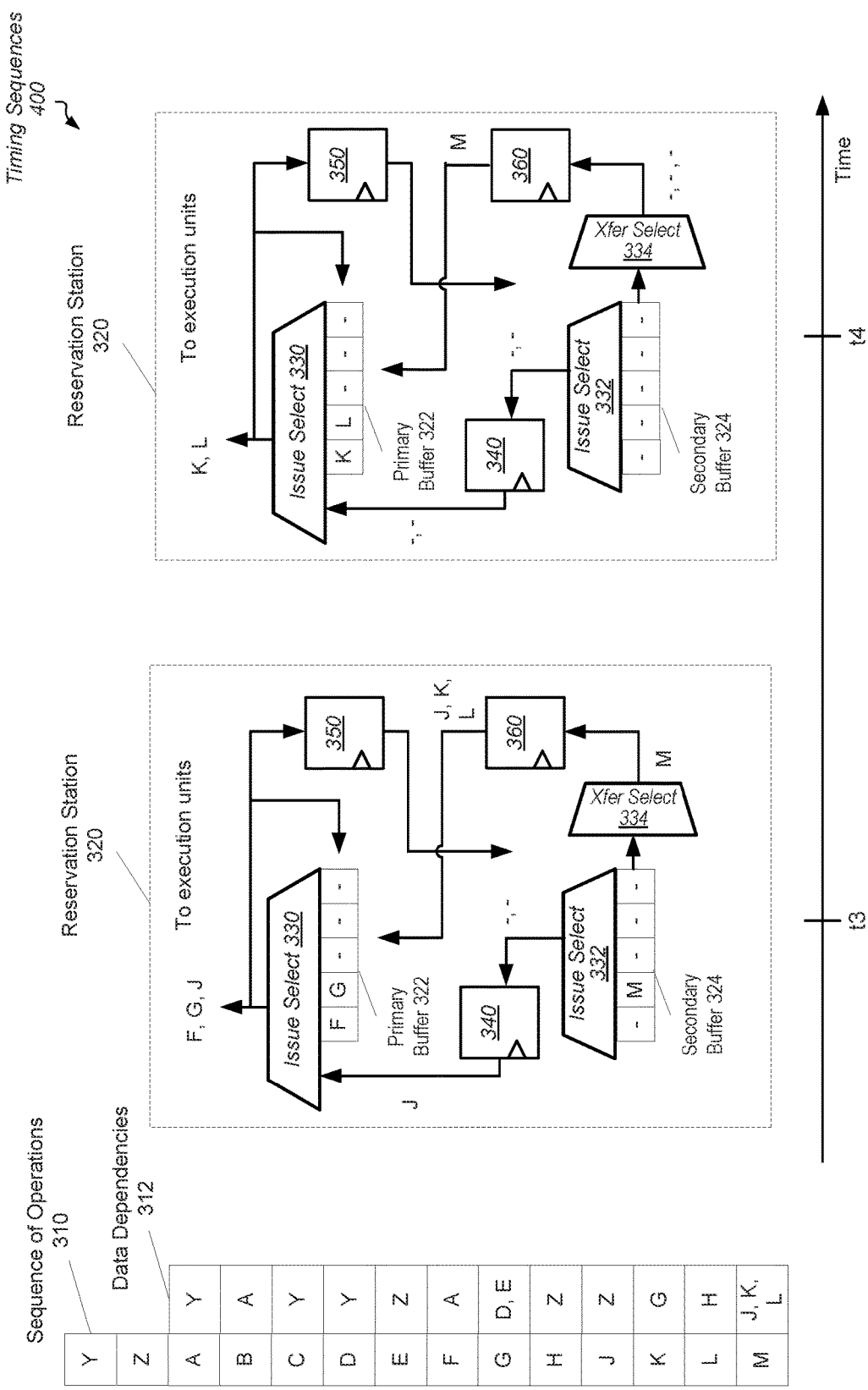
FIG. 4 is a block diagram of another embodiment of a timing sequence of reservation station processing operations.

Referring to FIG. 4, a block diagram of another embodiment of timing sequences 400 of a reservation station processing operations is shown. Control logic and circuitry described earlier is numbered identically. The sequence of processing steps shown for times t3 and t4 continue from the processing steps shown earlier in FIG. 3 for times t1 and t2. At time t3, primary buffer 322 currently stores the ops F and G. Although op H was also transferred, this op was canceled for entry into primary buffer 322, since op H was already selected for issue through the path from secondary buffer 324 through staging elements 340. Secondary buffer stores op M since the other ops were selected for transfer. However, in other embodiments, op H is written into the primary buffer 322, but op H is not selected for issue. In a following clock cycle, op H is removed from the primary buffer 322.

Issue select 330 selects the ops F and G from primary buffer 322 as the highest priority ops with ready source operands to issue to one or more available execution units. Additionally, issue select 330 selects op J, which was sent to issue select 330 from the staging elements 340. Indications of the destination operands for ops F, G and J in addition to any further latency information for these ops is returned to the control logic for the primary buffer 322. Additionally, this information is sent to the staging elements 350. Primary buffer 322 receives the transferred ops J, K and L from the staging elements 360.

Issue select 332 does not select any ops, since there are no ops with ready source operands. The op M is dependent on op L, which has not yet issued. Staging elements 340 receives an indication that there are not valid selected ops in this clock cycle. In addition, xfer select 334 selects op M from secondary buffer 324 to send to primary buffer 322. As described earlier, op M does not have all source operands ready since op M depends on op L. Staging elements 360 receives the selected information.

At time t4, primary buffer 322 currently stores the ops K and L. Although op J was also transferred, this op was canceled for entry into primary buffer 322 since op J was already selected for issue through the path from secondary buffer 324 through staging elements 340. Secondary buffer currently stores no ops since there are no more ops to dispatch in this example.

Issue select 330 selects the ops K and L from primary buffer 322 as the highest priority ops with ready source operands to issue to one or more available execution units. Indications of the destination operands for ops K and L in addition to any further latency information for these ops is returned to the control logic for the primary buffer 322. Additionally, this information is sent to the staging elements 350. Primary buffer 322 receives the transferred op M from the staging elements 360. Each of issue select 332 and xfer select 334 selects no ops since secondary buffer 324 currently stores no ops. Although not shown, at a later time, such as time t5, issue select 330 selects op M as the highest priority ops with ready source operands to issue to one or more available execution units.

Figure 5:
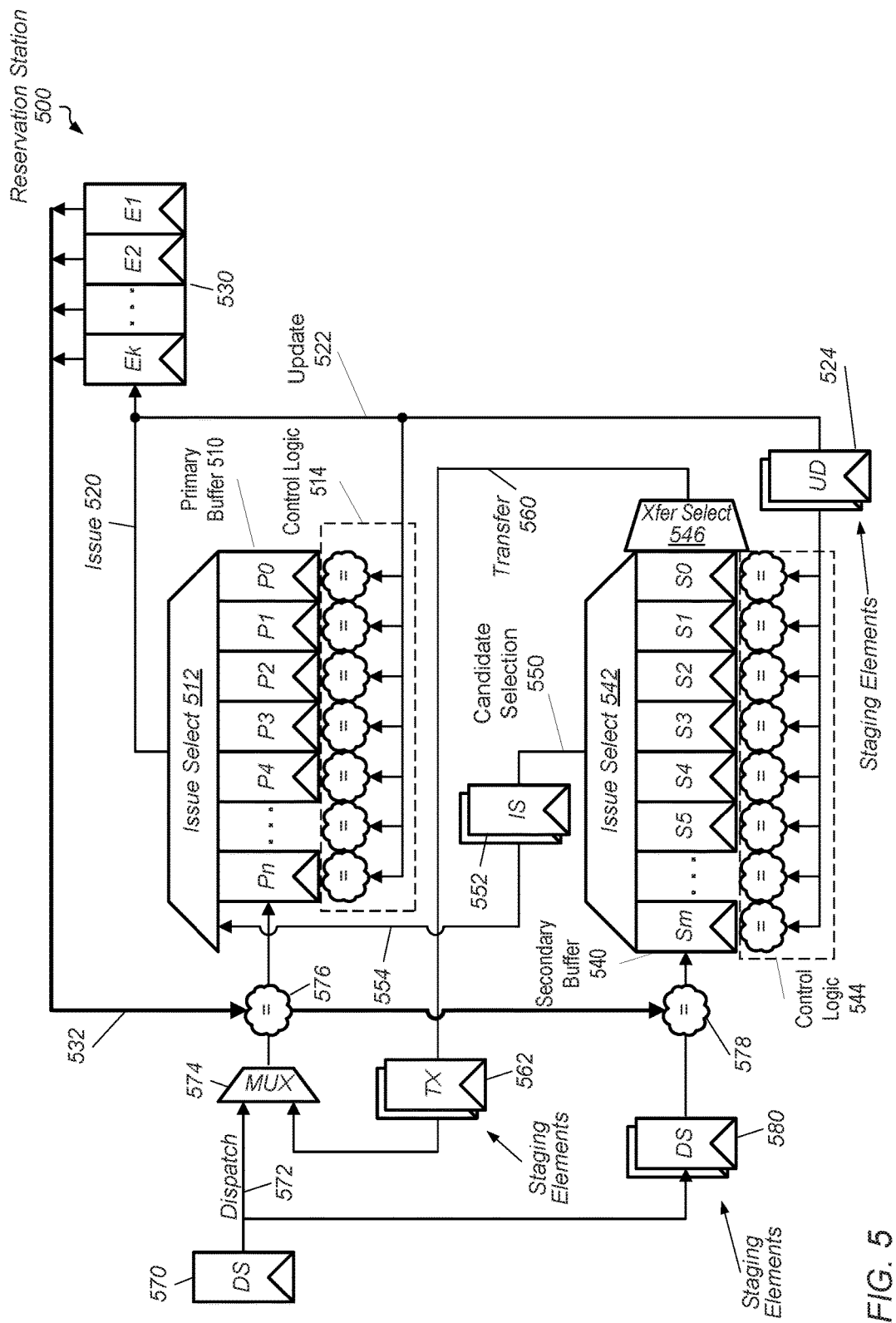
FIG. 5 is a block diagram of another embodiment of a reservation station.

Turning now to FIG. 5, a block diagram of one embodiment of a reservation station 500 is shown. In the illustrated embodiment, reservation station 500 stores N ops in primary buffer 510 and M ops in secondary buffer 540. Selection logic for selecting ops for issue for primary buffer 510 is shown as issue select 512, which, in some embodiments, includes many multiplexors arranged in a particular order. Similarly, selection logic selecting ops for issue for the secondary buffer 540 is shown as issue select 542. The output 520 of issue select 512 is sent to sequential elements 530 for storage before being sent to one or more execution units. Any issue width may be supported by reservation stations 500. The number of sequential elements 530 is based on the issue width and the amount of information to carry with each selected op through the processor pipeline from an issue stage to an execution stage.

Sequential elements 552 add one or more stage boundaries between the output of issue select 542, which is shown as candidate selection 550, and the input 554 of issue select 512. As described earlier, the number of stage boundaries in reservation station 500 is based on the duration of the clock cycle, the latencies for issue select 512 and issue select 542, the propagation delay to route the output 552 to issue select 512, and the added latency for issue select 512 by connecting the output 550 to issue select 512. In some embodiments, there are no stage boundaries if primary buffer 510 and secondary buffer 540 are located relatively close to one another and there is time left in the clock cycle for the added propagation delay and the added latency to issue select 512.

The output issue select 520 is sent to control logic 514 to determine whether source operands for outstanding ops are ready based on the recently issued ops. Each issued op that writes a register wakes up its true dependent ops. The update information 522 (also referred to as wakeup information) includes indications of the issued ops and corresponding execution latency information. The younger data dependent ops use the quickest available execution result bypass path. The execution latency information is used for just-in-time issue for the younger data dependent ops. As shown, the fanout for update 522 can be appreciably high, so the sequential elements 524 add one or more stage boundaries and reduce the fanout.

As shown, the output 532 of sequential elements 530 is routed to control logic 576 and 578 to also determine whether source operands for incoming ops are ready based on the selected and issued ops. Similar to control logic 514 and 544, each of control logic 576 and 578 includes comparators to determine whether data dependencies exist with the issued ops. Execution latency information may also be included as it is for update 522. In some embodiments, the update 522 is routed to control logic 576 and 578 if timing is still met for a particular clock cycle.

The sequential elements 570 send dispatched ops to primary buffer 510 and sequential elements 570 and 580 send dispatched ops to secondary buffer 540. Sequential elements 580 add one or more stage boundaries with respect to the dispatch output 572 for secondary buffer 540. Again, propagation delay, fanout, dispatch width and transfer width are some reasons for adding stage boundaries. The selection logic 574 selects between the number of dispatched ops on output 572 and the number of transferred ops sent from secondary buffer 540 through sequential elements 562. Selection logic for selecting ops for transfer from secondary buffer 540 to primary buffer 510 is shown as xfer select 546.

As described earlier, primary buffer 510 stores N ops labeled P0 to Pn and secondary buffer 540 stores M ops labeled S0 to Sm. In various embodiments, each instruction stored in primary buffer 510 has a higher priority than any instruction stored in the secondary buffer 540. In some embodiments, determining the priority for an op is based on one or more of an age of the instruction in program order, an assigned priority level for the instruction, a thread identifier and/or a process identifier for the instruction and so forth.

Each buffer entry in buffers 510 and 540 may store an op dispatched from the dispatch unit (not shown). Additionally, each buffer entry in primary buffer 510 may store an op transferred from secondary buffer 540. Each buffer entry may include a valid indicator (e.g., a single bit '1' or '0') to indicate if the buffer entry contains a valid op. Each buffer entry may indicate if the op in the corresponding buffer entry is ready to be issued. In various embodiments, a buffer entry may be ready to be issued if all of the op's sources are ready. Each buffer entry may also include any number of other fields associated with the op, depending on the embodiment.

In some embodiments, one or more of primary buffer 510 and secondary buffer 540 is a shifting structure with ops coming into one side (e.g., the bottom) of the buffer and existing ops shifted up as new instruction ops come into the buffer. In other embodiments, one or more of primary buffer 510 and secondary buffer 540 is a non-shifting structure with an age matrix. The age matrix may include age vectors corresponding to buffer entries. Each age vector indicates whether the corresponding entry's op is older than the other ops in the other entries. Entries in the buffers 510 and 540 may be randomly allocated.

Figure 6:
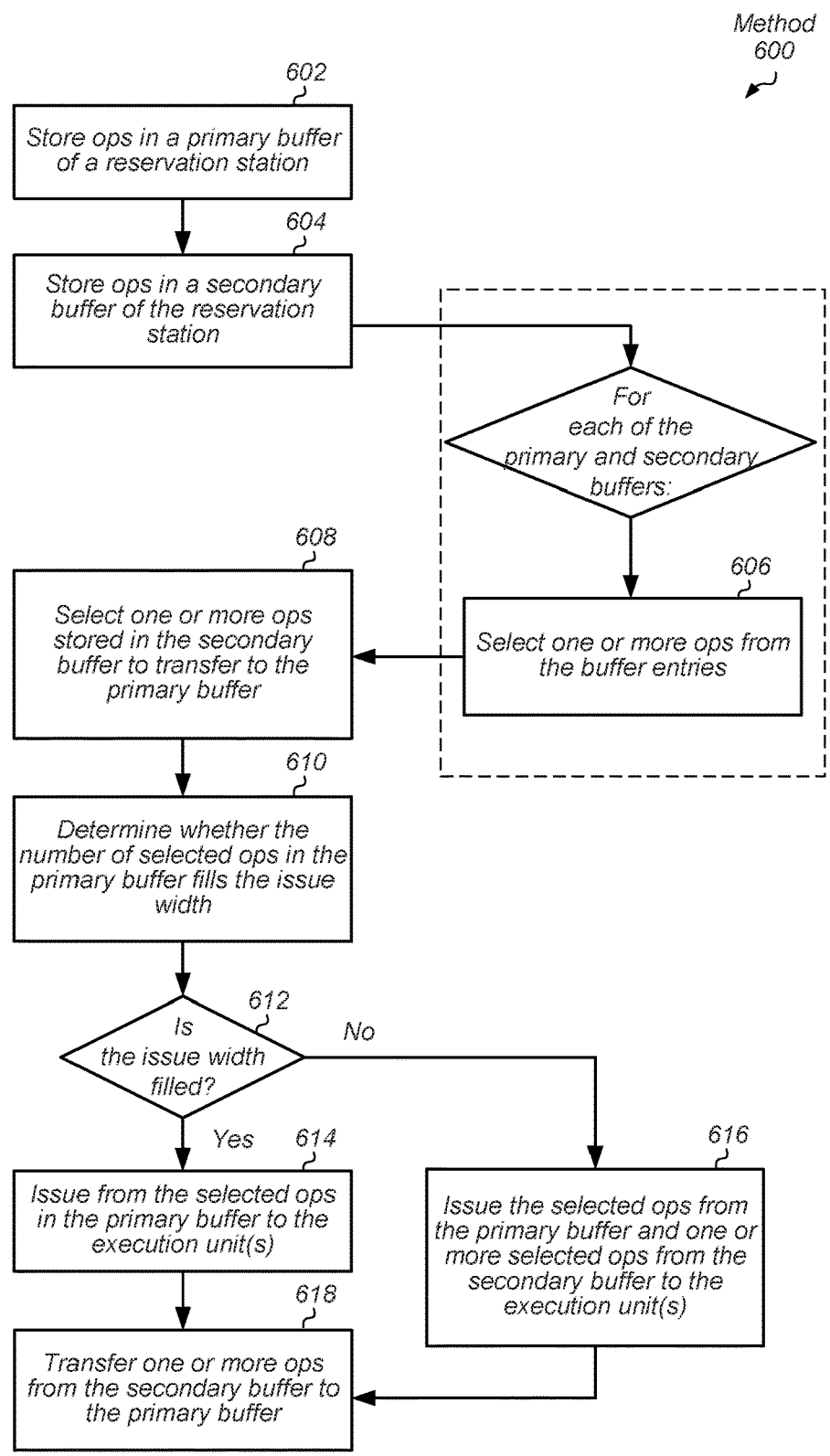
FIG. 6 is a flow diagram of one embodiment of a method for efficiently scheduling processor instruction operations for execution.

Referring to FIG. 6, one embodiment of a method 600 for efficiently scheduling processor instruction operations for execution is shown. For purposes of discussion, the steps in this embodiment are shown in sequential order. It should be noted that in various embodiments of the method described below (similarly for FIG. 7), one or more of the elements described may be performed concurrently, in a different order than shown, or may be omitted entirely. Other additional elements may also be performed as desired. Any of the various systems and/or apparatuses described herein may be configured to implement method 600.

In various embodiments, a reservation station is divided into at least two portions to form a hierarchical reservation station. A first portion includes a primary buffer and a second portion includes a secondary buffer. In various embodiments, each op stored in the primary buffer has a higher priority than any op stored in the secondary buffer. In some embodiments, determining the priority for an op is based on one or more of an age of the op in program order, an assigned priority level for the op, a thread identifier and/or a process identifier for the op, and so forth.

In some embodiments, the first portion and the second portion are located near one another on a semiconductor chip die. In other embodiments, the second portion is located a relatively far distance from the first portion, which causes one or more stage boundaries to be used for sending information between them. One or more ops are stored in entries of the primary buffer of a reservation station (block 602). One or more ops are also stored in entries of the secondary buffer of a reservation station (block 604).

Control logic for each of the primary buffer and the secondary buffer selects one or more ops from the buffer entries (block 606). In various embodiments, control logic determines a first number of instructions stored in the primary buffer that have both ready source operands and available execution units for executing the instructions. Additionally, the control logic determines a second number of instructions stored in the secondary buffer that have both ready source operands and available execution units for executing the instructions. The control logic also selects ops in the secondary buffer to transfer to the primary buffer (block 608). In some embodiments, the selected ops for transfer includes ops with a highest priority among ops stored in the secondary buffer although the source operands may not yet be ready. As described earlier, priority is based on one or more of program order, an assigned priority level, a thread identifier, a process identifier and so forth.

Control logic determines whether the first number of selected ops in the primary buffer fills the issue width (block 610). The issue width is the maximum number of instructions the reservation station is able to issue to one or more execution units in a clock cycle. If the issue width is filled by the selected ops from the primary buffer ("yes" branch of the conditional block 612), then ops among the selected ops from the primary buffer are issued to one or more execution units (block 614). If the first number of ops in the primary buffer is greater than the issue width, then only a number equal to the issue width of selected ops are actually issued from the primary buffer to one or more execution units. Selection of which ops to issue is based on priority. Again, in various embodiments, priority is based on one or more of program order, an assigned priority level, a thread identifier, a process identifier and so forth.

If the issue width is not filled by the selected ops from the primary buffer ("no" branch of the conditional block 612), then the selected ops from the primary buffer are issued in addition to one or more selected ops from the secondary buffer are issued to the one or more execution units (block 616). Selection of which ops of the second number of ops in the secondary buffer to issue is based on priority. For example, if the issue width is 4, the first number of ops selected in the primary buffer is 3, and the second number of ops selected in the secondary buffer is 2, then all 3 of the selected ops in the primary buffer are issued and 1 of the 2 ops in the secondary buffer is issued. Selecting which one of the two ops selected in the secondary buffer to issue is based on priority. In addition, the one or more selected ops are transferred from the secondary buffer to the primary buffer (block 618). In some embodiments, one or more stage boundaries are used to send ops for transfer and to send ops for consideration for issue.

Figure 7:
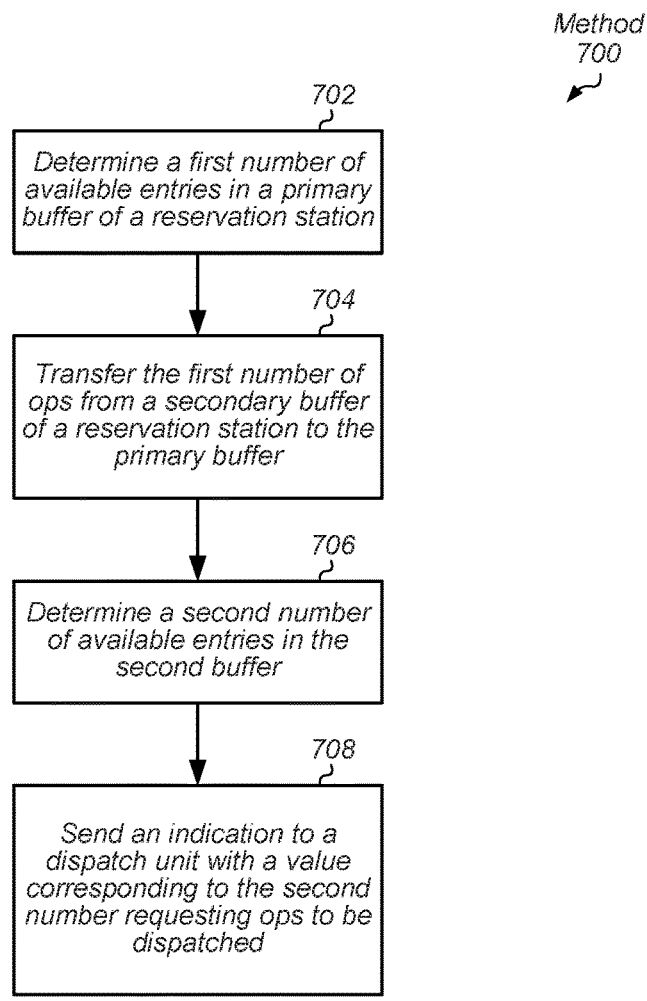
FIG. 7 is a flow diagram of one embodiment of a method for requesting a number of instructions to dispatch to a reservation station.

Referring to FIG. 7, one embodiment of a method 700 for requesting a number of instructions to dispatch to a reservation station is shown. A first number of available entries in a primary buffer of a reservation station is determined (block 702). The first number of available entries may include deallocated entries in the primary buffer. The first number of instructions is transferred from a secondary buffer of a reservation station to the primary buffer (block 704).

If the first number of available entries is less than the transfer width, then the first number of ops in transit from the secondary buffer is used to fill the available entries while other ops are recycled in their respective staging elements. If no stage boundaries are used, then the unselected ops are not removed from the secondary buffer.

A second number of available entries in the secondary buffer is determined (block 706). The second number of available entries may include one or more of already deallocated entries, newly deallocated entries such as entries deallocated within a past clock cycle, entries selected for issue to fill an issue width, and entries selected for transfer to the primary buffer. In some embodiments, an overlap of entries selected for filling an issue width and selected for transfer to the primary buffer is detected and appropriate adjustment of the second number is performed. For example, entries selected for both issue and transfer are not counted twice. An indication is sent to a dispatch unit with a value based on at least the second number requesting ops to be dispatched to the reservation station (block 708). As described earlier, in some embodiments, the value is the second number of available entries. In other embodiments, the value is a number of credits, or other value corresponding to the second number of available entries. In various embodiments, one or more stage boundaries are used in each of the dispatch path, the transfer path, the issue path from the secondary buffer and the update path to the secondary buffer with indications of at least destination operands of issued ops. In some embodiments, the number of stage boundaries is different for one or more of the paths from other paths.

These numbers of stage boundaries and any differences in the numbers is taken into account when determining the indication to send to the dispatch unit.

Figure 8:
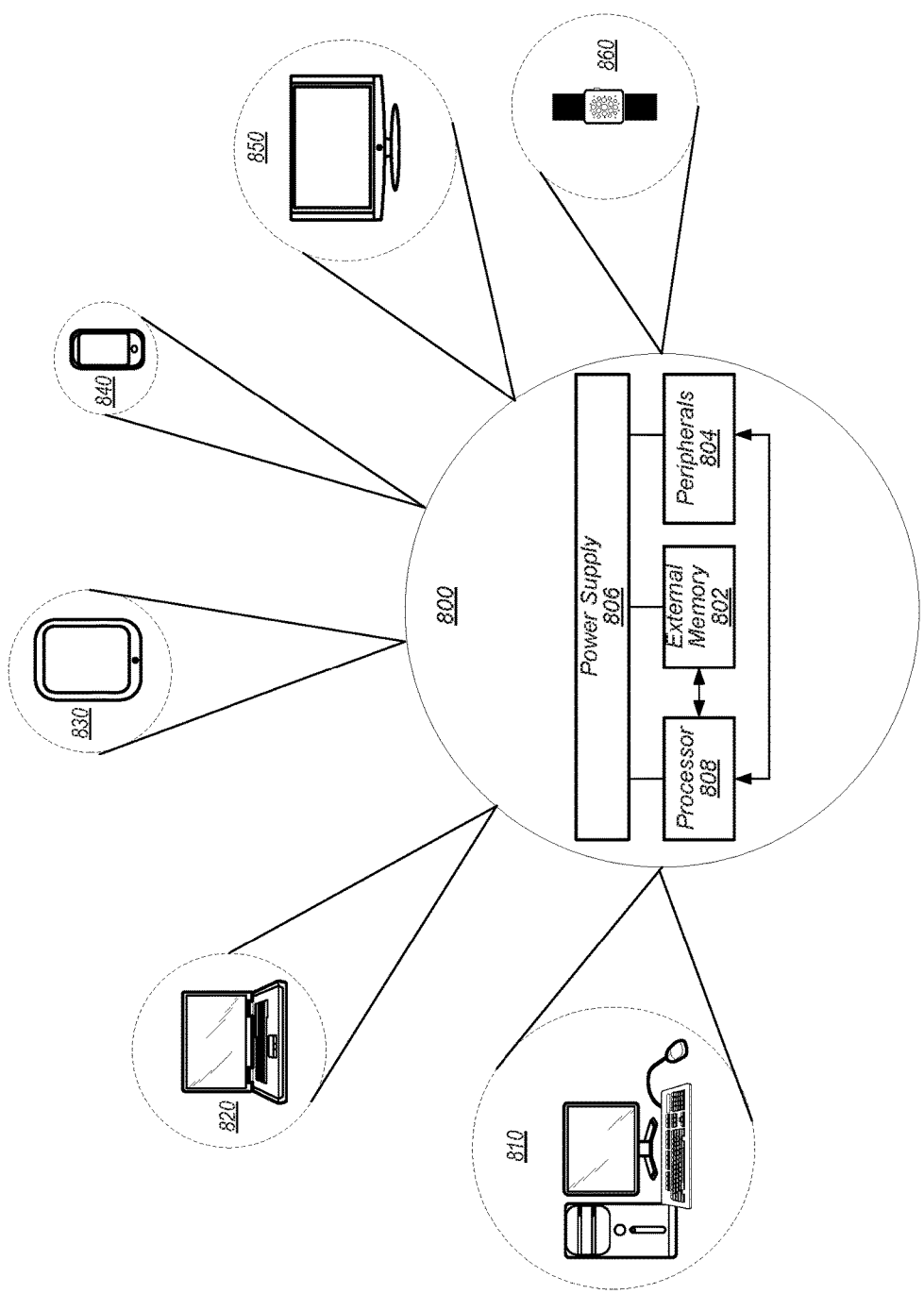
FIG. 8 is a block diagram of one embodiment of a system.

Turning next to FIG. 8, a block diagram of one embodiment of a system 800 is shown. As shown, system 800 may represent chip, circuitry, components, etc., of a desktop computer 810, laptop computer 820, tablet computer 830, cell or mobile phone 840, television 850 (or set top box configured to be coupled to a television), wrist watch or other wearable item 860, or otherwise. Other devices are possible and are contemplated. In the illustrated embodiment, the system 800 includes at least one instance of processor 808 which includes processor portion 100 (of FIG. 1) coupled to an external memory 802. In various embodiments, processor 808 with processor portion 100 may be included within a system on chip (SoC) or integrated circuit (IC) which is coupled to external memory 802, peripherals 804, and power supply 806.

Processor 808 is coupled to one or more peripherals 804 and the external memory 802. A power supply 806 is also provided which supplies the supply voltages to processor 808 as well as one or more supply voltages to the memory 802 and/or the peripherals 804. In various embodiments, power supply 806 may represent a battery (e.g., a rechargeable battery in a smart phone, laptop or tablet computer). In some embodiments, more than one instance of processor 808 may be included (and more than one external memory 802 may be included as well).

The memory 802 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an SoC or IC containing processor 100 in a chip-on-chip configuration, a package-on-package configuration, or a multi-chip module configuration.

The peripherals 804 may include any desired circuitry, depending on the type of system 800. For example, in one embodiment, peripherals 804 may include devices for various types of wireless communication, such as wifi, Bluetooth, cellular, global positioning system, etc. The peripherals 804 may also include additional storage, including RAM storage, solid state storage, or disk storage. The peripherals 804 may include user interface devices such as a display screen, including touch display screens or multi-touch display screens, keyboard or other input devices, microphones, speakers, etc.

In various embodiments, program instructions of a software application may be used to implement the methods and/or mechanisms previously described. The program instructions may describe the behavior of hardware in a high-level programming language, such as C. Alternatively, a hardware design language (HDL) may be used, such as Verilog. The program instructions may be stored on a non-transitory computer readable storage medium. Numerous types of storage media are available. The storage medium may be accessible by a computer during use to provide the program instructions and accompanying data to the computer for program execution. In some embodiments, a synthesis tool reads the program instructions in order to produce a netlist comprising a list of gates from a synthesis library.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A reservation station comprising:
a primary buffer comprising a plurality of entries, wherein each entry is configured to store an instruction operation;
a secondary buffer different from the primary buffer comprising a plurality of entries, wherein each entry is configured to store an instruction operation;
control logic configured to:
determine a first number of instruction operations in the primary buffer that have ready source operands and available execution units for executing the first number of instruction operations;
determine a second number of instruction operations in the secondary buffer that have ready source operands and available execution units for executing the second number of instruction operations;
in response to determining an issue width of the reservation station is greater than the first number of instruction operations:
issue the first number of instruction operations from the primary buffer; and
issue one or more of the second number of instruction operations from the secondary buffer.

2. The reservation station as recited in claim 1, wherein the control logic is configured to:
receive instruction operations in the secondary buffer in a first clock cycle; and
determine which of the first number of instruction operations and second number of instruction operations to issue in a second clock cycle, wherein the second clock cycle is later than the first clock cycle.

3. The reservation station as recited in claim 1, wherein the control logic is configured to select a third number of instruction operations in the secondary buffer for transfer to the primary buffer.

4. The reservation station as recited in claim 3, wherein the control logic is further configured to cancel transfer of a given instruction operation of the third number of instruction operations in response to determining the given instruction operation has issued.

5. The reservation station as recited in claim 3, wherein the control logic is further configured to send a value to a dispatch unit corresponding to a fourth number of instruction operations to dispatch to the reservation station, wherein the value is based on one or more of the second number of instruction operations and the third number of instruction operations.

6. The reservation station as recited in claim 3, wherein instruction operations stored in the primary buffer have a higher priority than instruction operations stored in the secondary buffer.

7. The reservation station as recited in claim 6, wherein selecting instruction operations to issue from the reservation station and selecting instruction operations to transfer from the second buffer to the first buffer is based on priority.

8. The reservation station as recited in claim 7, wherein said priority is based on one or more of program order, an assigned priority level, a thread identifier, and a process identifier.

9. A method comprising:
storing instruction operations received from a dispatch unit in a primary buffer;
storing instruction operations received from a dispatch unit in a secondary buffer;
determining a first number of instruction operations in the primary buffer that have ready source operands and available execution units for executing the first number of instruction operations;
determining a second number of instruction operations in the secondary buffer that have ready source operands and available execution units for executing the second number of instruction operations;
in response to determining an issue width of the reservation station is greater than the first number of instruction operations:
issuing the first number of instruction operations from the primary buffer; and
issuing one or more of the second number of instruction operations from the secondary buffer.

10. The method as recited in claim 9, further comprising:
receiving instruction operations in the secondary buffer in a first clock cycle; and
determining which of the first number of instruction operations and second number of instruction operations to issue in a second clock cycle, wherein the second clock cycle is later than the first clock cycle.

11. The method as recited in claim 9, further comprising selecting a third number of instruction operations in the secondary buffer for transfer to the primary buffer.

12. The method as recited in claim 11, further comprising canceling transfer of a given instruction operation of the third number of instruction operations in response to determining the given instruction operation has issued.

13. The method as recited in claim 11, further comprising sending a value to a dispatch unit corresponding to a fourth number of instruction operations to dispatch to the reservation station, wherein the value is based on one or more of the second number of instruction operations and the third number of instruction operations.

14. The method as recited in claim 11, wherein each op stored in the primary buffer has a higher priority than any op stored in the secondary buffer.

15. The method as recited in claim 14, wherein said priority is based on one or more of program order, an assigned priority level, a thread identifier and a process identifier.

16. A processor comprising:
a dispatch unit configured to dispatch decoded instruction operations (instruction operations) to a reservation station;
one or more execution units; and
a reservation station configured to:
store instruction operations in a primary buffer;
store instruction operations in a secondary buffer;
determine a first number of instruction operations in the primary buffer that have ready source operands and available execution units for executing the first number of instruction operations;
determine a second number of instruction operations in the secondary buffer that have ready source operands and available execution units for executing the second number of instruction operations;
in response to determining an issue width of the reservation station is greater than the first number of instruction operations:
issue the first number of instruction operations from the primary buffer; and
issue one or more of the second number of instruction operations from the secondary buffer.

17. The processor as recited in claim 16, wherein the reservation station is configured to select a third number of instruction operations in the secondary buffer for transfer to the primary buffer.

18. The processor as recited in claim 17, wherein the reservation station is further configured to cancel transfer of a given instruction operation of the third number of instruction operations in response to determining the given instruction operation has issued.

19. The processor as recited in claim 17, wherein the reservation station is further configured to send a value to a dispatch unit corresponding to a fourth number of instruction operations to dispatch to the reservation station, wherein the value is based on one or more of the second number of instruction operations and the third number of instruction operations.

20. The processor as recited in claim 17, wherein instruction operations stored in the primary buffer have a higher priority than instruction operations stored in the secondary buffer.

* * * * *